Aug. 23, 1949.     A. L. BENSEN     2,479,716
MEANS FOR HAND-CARRYING OF LIGHTING AND CAMERA MEANS
Filed April 15, 1947     5 Sheets-Sheet 1
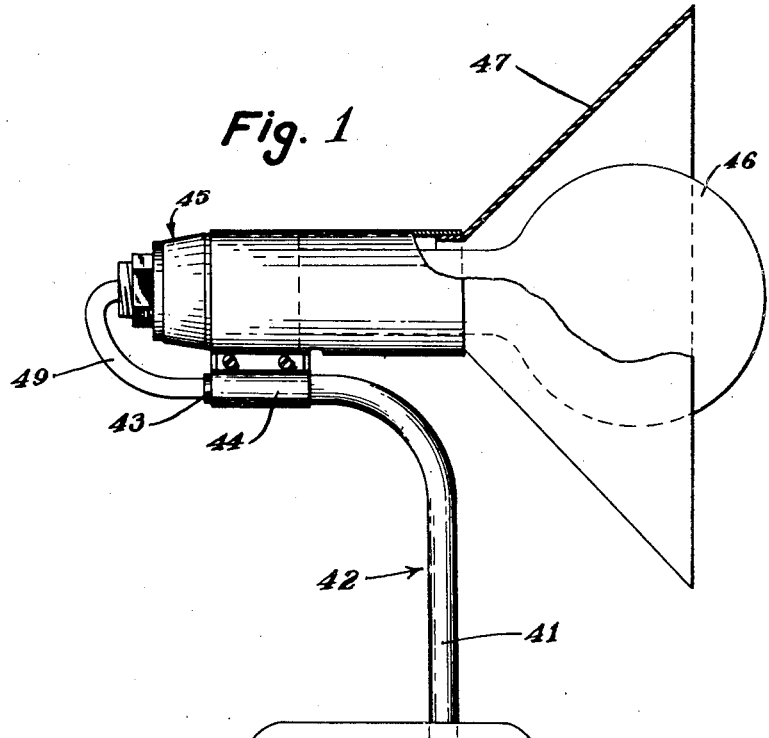
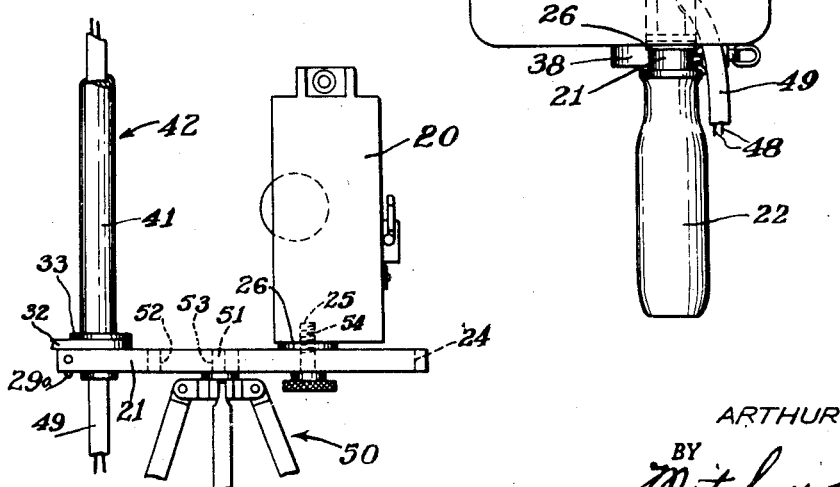
INVENTOR.
ARTHUR L. BENSEN
BY
*Mitchell Bahert*
ATTORNEYS Aug. 23, 1949.　　　　A. L. BENSEN　　　　2,479,716
MEANS FOR HAND-CARRYING OF LIGHTING AND CAMERA MEANS
Filed April 15, 1947　　　　　　　　　　　　　　　5 Sheets-Sheet 2
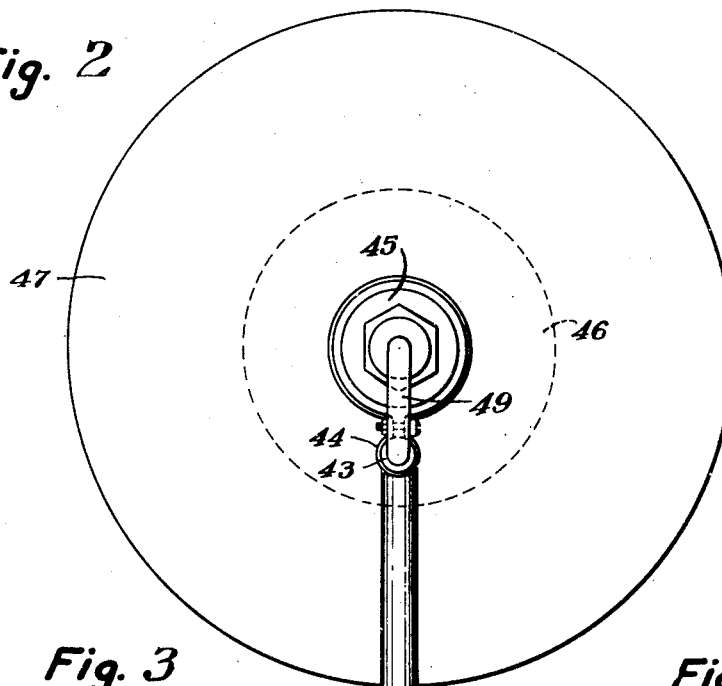
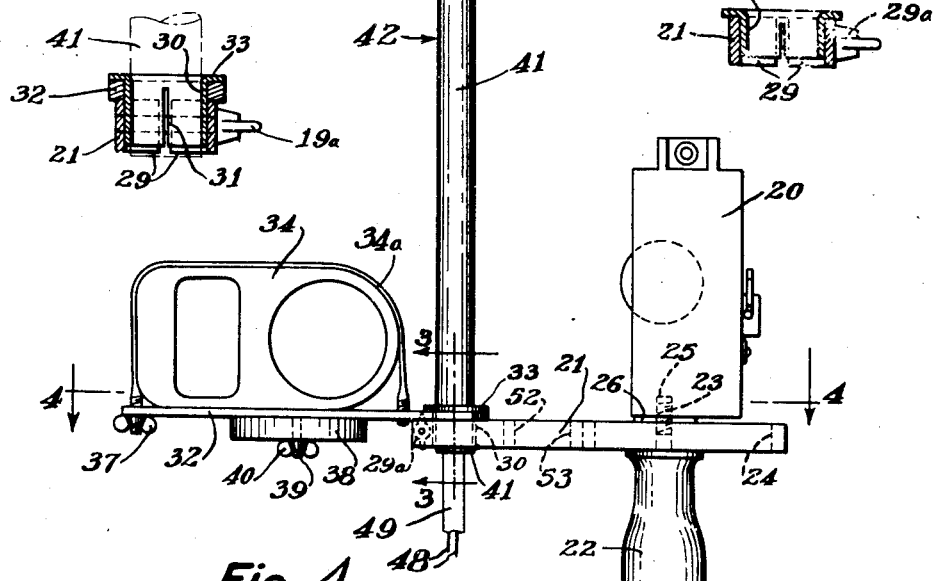
INVENTOR.
ARTHUR L. BENSEN
BY
ATTORNEYS Aug. 23, 1949.     A. L. BENSEN     2,479,716
MEANS FOR HAND-CARRYING OF LIGHTING AND CAMERA MEANS
Filed April 15, 1947     5 Sheets-Sheet 3
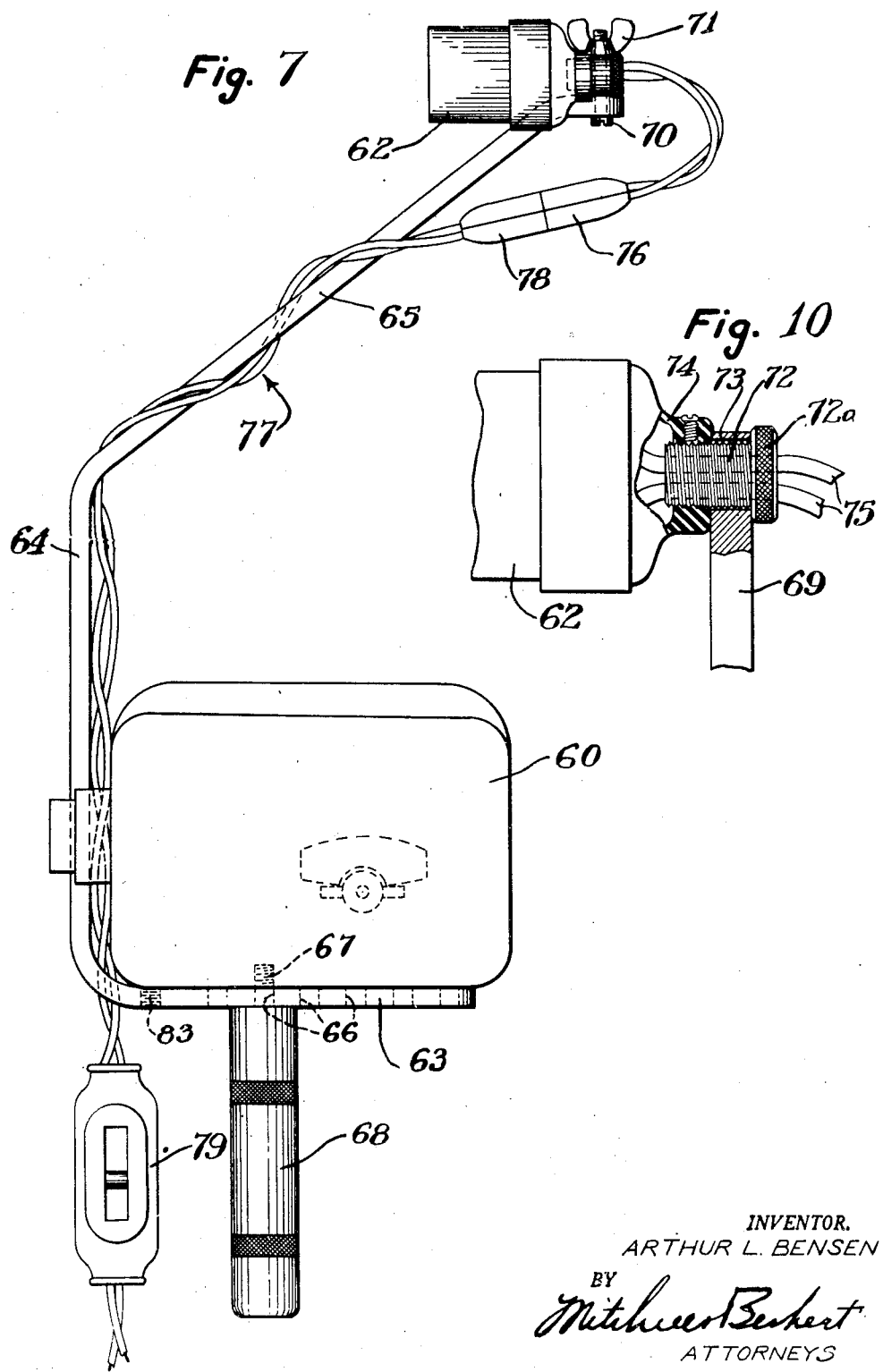
INVENTOR.
ARTHUR L. BENSEN
BY
*Mitchell Berhert*
ATTORNEYS

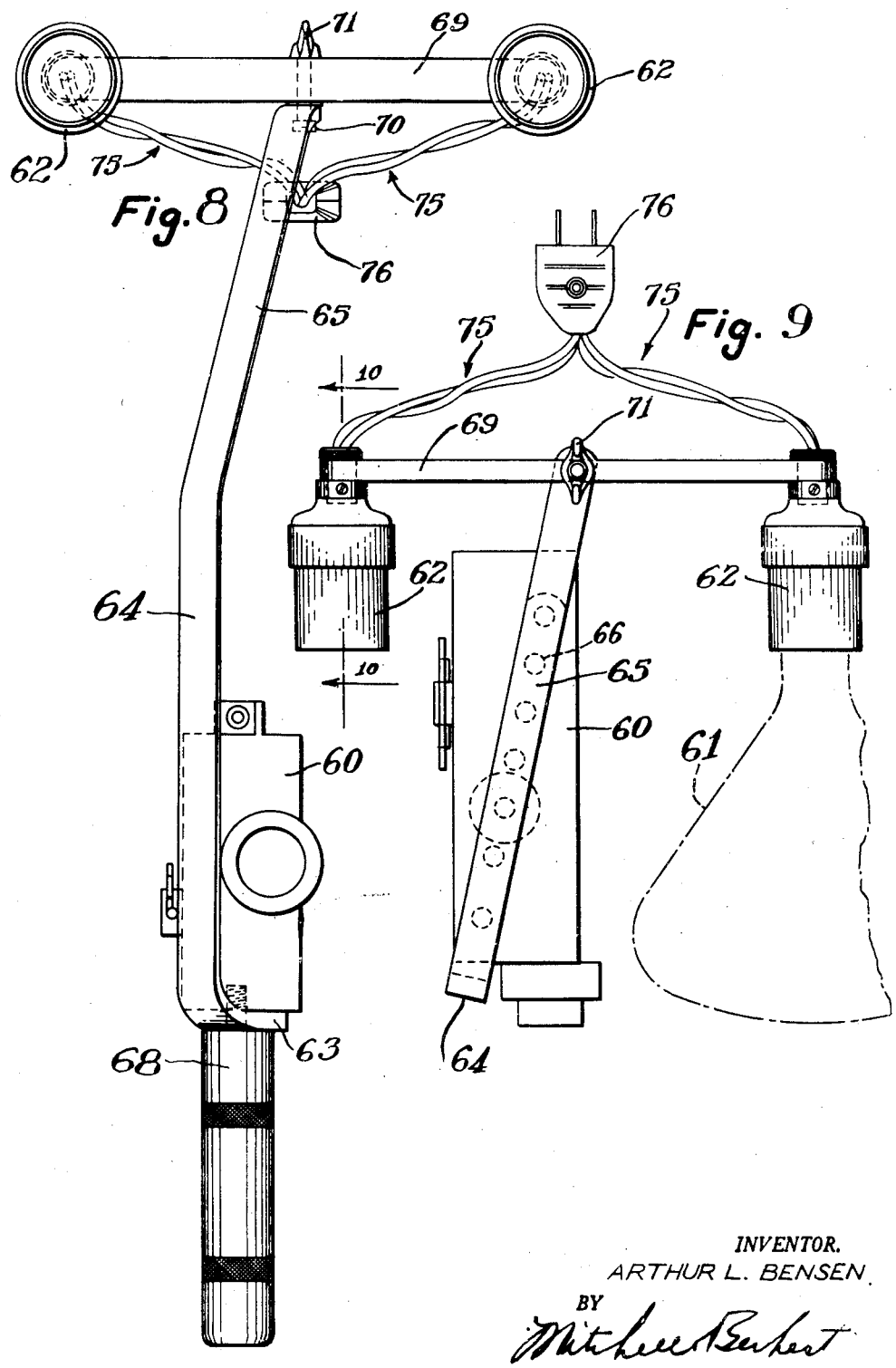

Aug. 23, 1949. A. L. BENSEN 2,479,716
MEANS FOR HAND-CARRYING OF LIGHTING AND CAMERA MEANS
Filed April 15, 1947 5 Sheets-Sheet 5
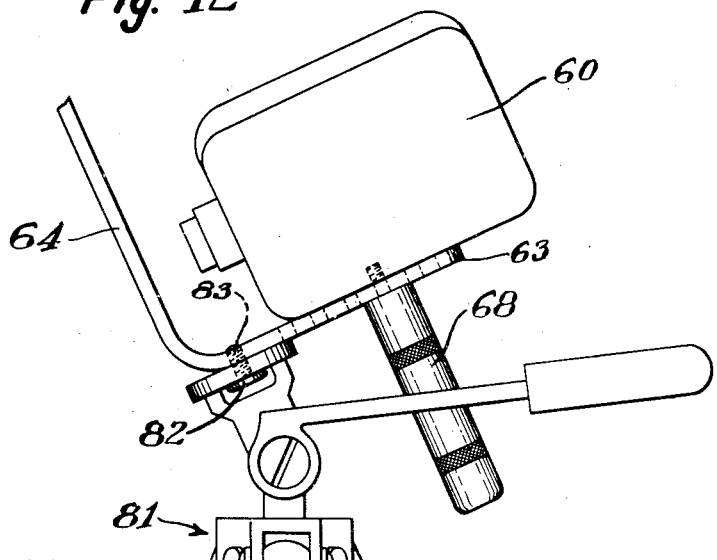
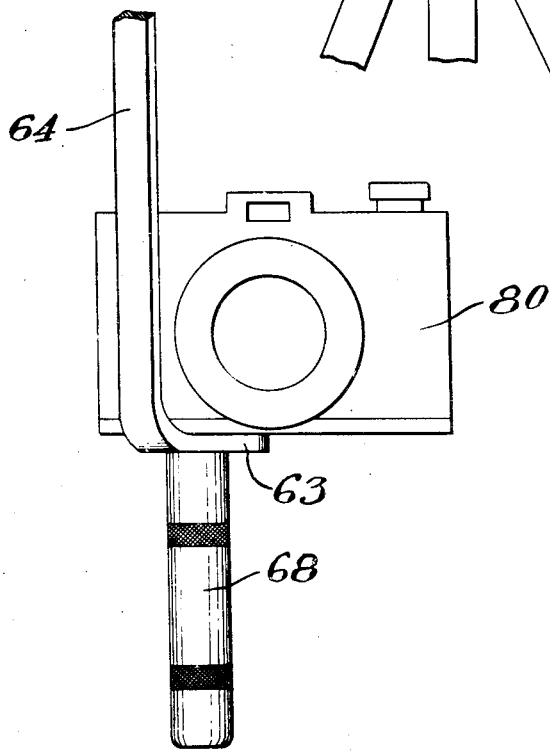
INVENTOR.
ARTHUR L. BENSEN
BY
ATTORNEYS Patented Aug. 23, 1949

2,479,716

UNITED STATES PATENT OFFICE 2,479,716

MEANS FOR HAND-CARRYING OF LIGHTING AND CAMERA MEANS

Arthur L. Bensen, West New Brighton, N. Y.

Application April 15, 1947, Serial No. 741,667

4 Claims. (Cl. 248—177)

My invention relates to photographic apparatus and more particularly to apparatus for use in taking pictures when special lighting must be provided, as in indoor photography. The present application is a continuation-in-part of my prior application Serial No. 646,365, filed February 8, 1946, which prior application was abandoned after the filing of this application.

In taking pictures indoors or under conditions of poor illumination, it is awkward and difficult to obtain proper lighting of the subject to be photographed. The usual procedure is to employ flood lamps that are independently adjustable and which, when adjusted, may remain fixed with respect to themselves but not necessarily with respect to the camera or to the subject to be photographed. This condition requires considerable shifting of the lamps and also considerable adjustment of the camera, not to mention troubles with the subject itself.

An important object of the invention is to provide novel and advantageous means whereby such difficulties may be readily overcome.

Another object of the invention is to provide novel and advantageous apparatus whereby a camera and a lighting source may be adjusted to proper relative positions and the adjustment may be maintained.

It is also an object to provide an improved means for illuminating a subject to be photographed whereby the illumination may be concentrated and maintained in the field of view of the camera.

A further object of the invention is to provide novel and advantageous apparatus whereby a camera, a lighting source, and an exposure meter may be adjusted to proper relative positions and the adjustments may be retained.

Another object is to provide novel camera and meter means for holding a camera and exposure meter in desired relative positions.

In carrying out the invention, provision may be made of supporting means adapted to be carried by one hand of the photographer or mounted on a tripod. This supporting means may be used to carry a camera and a lamp, or a camera, a lamp and an exposure meter or other accessories. The lamp is preferably, though not necesarily, at a higher level than the camera and offset horizontally therefrom. By use of a lamp in this way satisfactory lighting may be assured at all times. The meter indicates the proper exposure for a particular film, and the camera may be set accordingly. Provision may be made of means to determine the distance from the meter to the object or objects to be photographed.

Other objects, features and advantages will appear upon consideration of the following detailed description and of the drawings, in which:

Fig. 1 is a side elevation, partly broken away, of one embodiment of the invention, adapted for support by a handle;

Fig. 2 is a rear elevation of the apparatus shown in Fig. 1;

Fig. 3 is a section taken substantially along the line 3—3 of Fig. 2;

Fig. 4 is a sectional view taken substantially along the line 4—4 of Fig. 2;

Fig. 5 is a sectional view similar to Fig. 3, illustrating the use of a sleeve when the part of the apparatus to the left of the lamp (Fig. 2) is omitted;

Fig. 6 is a fragmentary view similar to Fig. 2 but with the apparatus supported by a tripod;

Fig. 7 is a side elevation of another embodiment of the invention, adapted for support by a handle;

Fig. 8 is a front elevation of the device of Fig. 7;

Fig. 9 is a plan view of the device of Fig. 7;

Fig. 10 is an enlarged fragmentary view, partly sectioned in the plane 10—10 of Fig. 9;

Fig. 11 is a fragmentary view illustrating the device of Fig. 7, with another type of camera secured thereto; and Fig. 12 illustrates an adaption of the device of Fig. 7 to a tripod.

Briefly stated, my invention contemplates supporting means for a plurality of photographic devices, such as a camera and a lamp. The supporting means comprises a bracket member including a camera-supporting portion and a lamp-supporting portion. Adjustable means may be provided for relative longitudinal adjustment of the camera with respect to the lamp, so that both may be secured, with the lens and the light source in essentially the same plane (normal to the photographic axis). In one specific form to be described, the bracket member comprises a generally upright lamp-supporting member having a cylindrical shank upon which a separate camera-supporting arm may be adjustably clamped. In another specific form, the bracket is formed of a single piece of material.

Referring to Figs. 1 through 5 of the drawings, a camera 20 is secured to a member or arm 21 by means of a device comprising a handle 22 arranged to engage the lower face of the arm 21. A screw 23 projects axially from the handle 22 through a longitudinal slot 24 in arm 21 and is screwed into the threaded bore 25, which is customarily provided on a camera to receive a tripod screw. Preferably, a washer 26 is placed over screw 23 between camera 20 and arm 21.

At the inner end of arm 21 means are provided for securing arm 21, a second apparatus-supporting arm 32, and a lamp-supporting upright 41 in adjusted relation. To effect such adjustment arm 32 is provided with a dependent bushing portion, which in the form shown comprises a sleeve 30 having a flange 33 overlying the inner end of arm 32 and welded or otherwise secured to arm 32. A slit 31, or a plurality of such slits, renders sleeve 30 radially compressible under the gripping action of jaws 29 formed at the inner end of arm 21. In the form shown, this grip is maintained by bolt and wing-nut means 29a.

Resting on arm 32 is a light or exposure meter 34 which may be secured in place by suitable means such as a flexible meter strap 34a extending over the meter and having rounded screw-threaded ends, the inner end being fixed in an opening 35 at the inner end of arm 32, and the other end passing through a hole 36 at the outer end of arm 32 and into a wing-nut 37 by which the strap may be tightened around the meter. Secured to the arm 32 is a tape 38 mounted on a screw 39 and held thereon by a wing nut 40.

Fitting closely in sleeve 30 is the vertical part 41 of a tubular lamp support 42 curved rearwardly at its upper part to provide a horizontal part 43. The horizontal part 43 may be gripped by a clamp 44 supporting a tubular lamp socket 45 to receive the neck of a large lamp 46. At the outer end of the socket and surrounding the bulb of the lamp 46 is a reflector 47, here shown as of conical shape. Wires 48 to supply current for the lamp are contained in an insulated cable 49, which enters the tubular member 42 just above the part 43 and after leaving said tubular member just to the rear of said clamp 44 is curved around to extend forwardly into the base of said socket 45, where suitable electrical connections are made.

When desired, the arm 21 may be supported on a tripod 50 (Fig. 6) having a screw 51 which may engage either one of two bores 52 and 53 in said arm 21. With this arrangement, the handle 22 and attached screw are removed and the camera 20 secured to the arm 21 by means of a suitable screw 54 with a knurled head and a threaded shank passing through slot 24 and screwed into the internally threaded bore in the base of the camera 20.

With the assembly just described, the arms 21 and 32 and the support 41 may be secured together in any suitable manner by tightening the thumb screw 29a. In some cases it may be desirable to remove the arm 32 and light meter 22 and to secure the lamp support 41 and arm 21 in any desired relation. The removal of arm 32 will leave so much room (i. e., space previously occupied by sleeve 30) that the inner ends of arm 21 cannot be thoroughly clamped on support 41. To enable such clamping together of the inner end of arm 21 and of the support 41, use may be made of a partially split sleeve or bushing 30a, slidably fitting in arm 21 and preferably having at its upper end a flange 33a resting on the upper face of arm 21.

Referring now to Figs. 7 through 10, I illustrate another embodiment of my invention in which the bracket member is formed as a unitary structure to support both a camera 60 and lamps or lamp sockets 62 therefor. In a preferred arrangement the bracket member comprises a generally horizontal and rearwardly extending camera-supporting arm 63, integrally formed with a generally upright portion 64 and with a lamp-supporting arm 65, which extends both upwardly and rearwardly. The structure may be such that both arms 63 and 65 lie substantially in a single plane. As an alternative to the adjustment slot 24 described for the Fig. 1 arrangement, a plurality of apertures 66 may be formed as by drilling the spaced points along the arm 63. It will be understood that by inserting a screw 67 (carried by a handle 68) through one of the apertures 66, the camera 60 may be secured in one of a number of desired longitudinal positions.

The lamp-supporting arm 65 may be arranged to carry a single lamp as in the case of the lamp 46 of Fig. 1, but in the form shown I show how a plurality of lamps may be positioned by the arm 65. A plurality of lamp sockets 62 may be fastened to a cross piece 69 and the cross piece adjustably secured about a central pivot. In the form shown, the central pivot is a bolt 70 which may be so mounted in the end of the lamp-supporting arm 65 as to provide a generally upright adjusting axis for the cross piece 69. The cross piece 69 may be secured in an adjusted position as by tightening a wing nut 71 on the bolt 70.

Support for the lamp socket 62 may be provided by a hollow screw member 72 passing through a bore 73 in an end of the cross piece 69 and threadedly received in the cap 74 of the socket 62. A take-up nut 72a engaging the screw 72 on the other side of the cross piece 69, completes the socket assembly.

Electrical conductors 75 to each of the sockets 62 may be brought together in a conventional connector plug 76, so that when the apparatus is dismounted as by removal of the wing nut 71, the cross piece assembly including the sockets 62 and the plug 76 may be compact and relatively easy to manage. When desired, a length of extension cord 77 terminating in a plug-receptacle 78 may be attached to the plug 76 for supplying lamps (such as 61) in socket 62. If desired to prevent the annoyance of dangling cord, the extension leads 77 may be wound around the lamp-supporting arm 65; the cord may then be free substantially from the handle 68 down. Also, if desired, and to increase the convenience of my attachment, a switch 79 may be attached to the extension cord 77 near the handle 68.

To illustrate other applications of the device of Fig. 7 I show in Fig. 11 how a conventional still-type camera 80 may be mounted on the camera-supporting arm 63 for use in the manner described for the camera 60. In Fig. 12 the camera 60 and the bracket construction of Fig. 7 (including the handle 68) are shown to be supported by a tripod 81. The conventional tripod screw 82 may be threadedly inserted in an appropriately tapped hole 83 on the camera-supporting arm 63.

It will be clear that I have described relatively simple arrangements whereby a camera and a steady source of illumination may be supported on the same structure, so that no matter how the camera is moved about for the purposes of acquiring a desired photographic subject, the illumination may always be adequate. In application to movie cameras, such as the camera 20 or the camera 60, the invention will be understood to provide for the relatively simple taking of panorama sequences indoors or under conditions of inferior lighting. Since the light source is carried along with the camera, it may always be properly directed in the field of view of the camera, and the only camera adjustment that need be made is one for exposure—a factor which may be only a function of the focusing distance to the subject. In view of this relationship between illumination and focusing distance, it will be seen that with an appropriately calibrated range finder, such as the measuring tape 28 (or a coupled range finder, not shown on the cameras) the relative-aperture setting may be read directly from the range determination.

It will be appreciated that the arrangement of Fig. 7 permits utilization of lamps 61 having special properties to produce novel effects. For example, one of the lamps in a socket 62 may be of the so-called spot type and another may provide flood illumination. In some cases, the directed beam of the spot lamp may be so narrow as not to illuminate the photographic field of view when the subject is at close range, due to parallax effects. In such cases, a parallax correction may be made as by slightly bending the lamp-supporting arm 65 with respect to the upright portion 64. Once the parallax correction has been made for a particular lamp, the adjustment should prove adequate for a reasonable spread of indoor ranges.

While I have described my invention in detail for the preferred forms shown, it will be understood that modifications may be made within the scope of the invention as defined in the appended claims.

I claim:

1. In a device of the character indicated, a base member to support a camera at the upper side, said base member having an opening therein, a handle member to fit beneath said base member and having a reduced threaded end to extend through said opening and engage a tapped aperture in a camera, whereby the base member, camera and handle may be unitarily assembled, said base member having an arm, and means on said arm for supporting lamp means, for the purpose set forth.

2. In the combination described in claim 1, said base member and arm being integrally formed.

3. In a device of the character indicated, a bar having a base portion and a bent up integral arm thereon at one end, said base portion having an aperture therein, a handle to fit beneath said base portion and having a reduced threaded end to extend through said opening and into a tapped opening in a camera to be supported at the upper side of said base portion, whereby said bar and handle may be unitarily assembled with a camera, and means at the upper end of said integral bent up arm for supporting lamp means.

4. In the combination defined in claim 3, said means at the upper end of said arm comprising a cross bar fixed to the upper end of said arm, and a plurality of means on said cross bar for supporting lamps.

ARTHUR L. BENSEN.

REFERENCES CITED

The following references are of record in the file of this patent:

UNITED STATES PATENTS

| Number | Name | Date |
|---|---|---|
| 1,621,903 | Rossiter | Mar. 22, 1927 |
| 2,213,749 | Strauss | Sept. 3, 1940 |
| 2,261,953 | Brown | Nov. 11, 1941 |
| 2,314,033 | Curran | Mar. 16, 1943 |
| 2,403,892 | McFarlane | July 9, 1946 |
| 2,427,593 | Etzel | Sept. 16, 1947 |